US008158234B2

(12) United States Patent
Wakabayashi et al.

(10) Patent No.: US 8,158,234 B2
(45) **Date of Patent: *Apr. 17, 2012**

(54) OPTICAL RECORDING MEDIUM

(75) Inventors: Mitsugu Wakabayashi, Tokyo (JP); Hideharu Takeshima, Tokyo (JP); Susumu Satou, Tokyo (JP); Naoyuki Uchida, Tokyo (JP); Katsumi Ebashi, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 806 days.

This patent is subject to a terminal disclaimer.

(21) Appl. No.: 12/161,405

(22) PCT Filed: Jan. 17, 2007

(86) PCT No.: PCT/JP2007/050616

§ 371 (c)(1),
(2), (4) Date: Oct. 3, 2008

(87) PCT Pub. No.: WO2007/083674

PCT Pub. Date: Jul. 26, 2007

(65) Prior Publication Data

US 2010/0166999 A1 Jul. 1, 2010

(30) Foreign Application Priority Data

Jan. 18, 2006 (JP) .............................. P.2006-010053

(51) Int. Cl.
*B32B 3/02* (2006.01)
*G11B 7/258* (2006.01)

(52) U.S. Cl. ................. 428/64.4; 428/64.9; G9B/7.192; G9B/7.193

(58) Field of Classification Search ................. 428/64.4, 428/64.9
See application file for complete search history.

(56) References Cited

U.S. PATENT DOCUMENTS

| | | | | |
|---|---|---|---|---|
| 5,171,731 | A * | 12/1992 | Inagaki et al. | 503/227 |
| 5,415,914 | A | 5/1995 | Arioka et al. | |
| 5,882,760 | A | 3/1999 | Hatwar et al. | |
| 7,758,944 | B1 * | 7/2010 | Fan et al. | 428/64.4 |
| 7,910,192 | B2 * | 3/2011 | Wakabayashi et al. | 428/64.9 |

(Continued)

FOREIGN PATENT DOCUMENTS

JP 60-95740 5/1985

(Continued)

OTHER PUBLICATIONS

Office Action issued Dec. 7, 2010, in Japanese Patent Application No. 2007-008005 (with English translation).

*Primary Examiner* — Gerard Higgins
(74) *Attorney, Agent, or Firm* — Oblon, Spivak, McClelland, Maier & Neustadt, L.L.P.

(57) ABSTRACT

The invention is principally to provide an archival optical recording medium of high quality which has satisfactory recording/reading characteristics when used in high-speed recording and high-density recording. The invention accomplishes the object with an optical recording medium comprising a resin substrate, a recording layer comprising an organic dye, and a reflective layer, wherein the reflective layer has a first reflective layer and a second reflective layer in this order from the side close to the recording layer, the second reflective layer has a thermal conductivity lower than the thermal conductivity of the first reflective layer, and the first reflective layer has a film thickness larger than the thickness of the second reflective layer.

9 Claims, 2 Drawing Sheets

U.S. PATENT DOCUMENTS

2005/0094548 A1 5/2005 Wada et al.

FOREIGN PATENT DOCUMENTS

| | | |
|---|---|---|
| JP | 60 195747 | 10/1985 |
| JP | 4 360039 | 12/1992 |
| JP | 6-76361 | 3/1994 |
| JP | 7-105576 | 4/1995 |
| JP | 7-201075 | 8/1995 |
| JP | 9-212915 | 8/1997 |
| JP | 10 228676 | 8/1998 |
| JP | 10 289481 | 10/1998 |
| JP | 11-167748 | 6/1999 |
| JP | 11 176022 | 7/1999 |
| JP | 11-232695 | 8/1999 |
| JP | 2001 35014 | 2/2001 |
| JP | 2001-184716 | 7/2001 |
| JP | 2002 150612 | 5/2002 |
| JP | 2005-132055 | 5/2005 |

* cited by examiner

OPTICAL RECORDING MEDIUM

TECHNICAL FIELD

The present invention relates to an optical recording medium. More particularly, the invention relates to an optical recording medium which is excellent in durability and light resistance, has satisfactory recording/reading characteristics in high-speed recording, and can withstand long-term storage.

BACKGROUND ART

Various optical recording media including a rewritable DVD and a recordable DVD are recently recognized widely as an external storage for information processing apparatus such as a computer because these optical recording media can store large-capacity information and are capable of easy random access. For example, a typical recordable DVD and the like comprising a recording layer comprising an organic dye has a multilayer structure which comprises an organic-dye recording layer and a reflective layer placed in this order on a transparent disk substrate and further comprises a protective layer with which the recording layer and the reflective layer are covered. In such recording media, recording/reading is performed with a laser light through the transparent disk substrate (resin substrate). These optical recording media comprising a recording layer comprising an organic dye are known to increase in error due to the influence of water present at the interface between the organic-dye layer and the reflective layer (see patent document 1).

Optical recording media intended to prevent such increase in error have been proposed which include: an optical recording medium comprising a first reflective layer of gold or a gold alloy laminated on an organic-dye recording layer and a second reflective layer of a silver alloy or copper alloy laminated on the first reflective layer (patent document 1); and an optical recording medium which comprises a thin metallic interlayer made of Pd, Ni, Sn, Au, In, Te, Si, Ge, or an alloy of any of these placed on an organic-dye recording layer and a reflective layer of silver or a silver alloy placed on the interlayer (patent document 2).

Incidentally, an optical recording apparatus retains a recording condition optimized beforehand for various optical recording media, and use of the recording condition enables satisfactory recording. The recording media to be used vary in reflectance and thermal conductivity depending on the kind of the reflective layer (e.g., the material and thickness of the reflective layer). Because of this, a different recording condition is used for a disk differing in reflective layer.

In the recordable DVD and CD-R disc which are mainly used presently, most disks employ a reflective layer made of silver or an alloy comprising silver as a main component. Because of this, the recording condition originally possessed in the optical recording apparatus has been optimized for a silver reflective layer. There has hence been a possibility that optical recording media such as those described in patent document 1 and patent document 2 cannot have satisfactory recording characteristics when used under the recording condition originally possessed in the optical recording apparatus and optimized for the optical recording media employing a silver reflective layer. Furthermore, since the reflective layer of those optical recording media has a lower reflectance than the silver reflective layer due to the constitutions thereof, there has been a possibility that sufficient recording characteristics cannot be obtained or the choice of a recording material might be narrowed. In addition, especially in high-speed recording, it is necessary to reduce thermal interference to widen a margin of recording characteristics.

However, this necessitates a reduction in the film thickness of the dye recording layer, resulting in a decrease in reflectance.

There has hence been a possibility that it might be difficult to maintain recording characteristics.

On the other hand, a technique is known in which a first reflective layer made of a pure metal and having a high reflectance and a second reflective layer having a lower thermal conductivity than the first reflective layer are laminated on a light-absorbing layer comprising an organic dye to thereby reconcile power margin in high-speed recording and reflectance (reference document 3). This is intended to obtain a practical level of reflectance with the first reflective layer and to lower the overall thermal conductivity with a lowly thermally conductive material of the second reflective layer. In this case, however, the first reflective layer has a film thickness reduced to 50 nm or smaller in order to enhance the effect produced by the thermal conductivity of the second reflective layer, and there is hence a problem that a decrease in reflectance in some degree is unavoidable. Furthermore, in view of the current situation in which optical recording apparatus optimized for an optical disk employing a silver reflective layer have already spread, there has been a possibility that optical recording media having that constitution cannot have satisfactory characteristics under the recording condition originally possessed in the optical recording apparatus because these recording media require different recording characteristics.

An optical recording medium employing a reflective layer constituted of a single layer of gold or an alloy thereof has also been proposed. A gold reflective layer is known to be an exceedingly satisfactory reflective layer because of the chemical stability thereof. However, there has been a possibility that the optical recording medium employing a gold reflective layer cannot have satisfactory recording characteristics when used with the optical recording apparatus which have already spread, as stated above. In addition, since gold has a poor affinity for an organic-dye recording layer, there has been a possibility that interfacial separation between the reflective layer and the recording layer might occur to cause errors.

Patent Document 1: JP-A-2001-184716
Patent Document 2: JP-A-11-232695
Patent Document 3: JP-A-2001-035014

DISCLOSURE OF THE INVENTION

Problems that the Invention is to Solve

In a recording layer comprising an organic dye, a recording part is generally formed in the following manner.

The dye decomposes upon absorption of a condensed laser light for recording to change in optical constant and cause a decrease in film thickness and an increase in pressure in this part, and that part around the recording layer which is exposed to a high temperature hence changes to thereby form a recording part. During this recording, heat diffusion is less apt to occur due to the exceedingly low thermal conductivity of the organic dye, as different from the recording layer of a phase-change medium. Because of this, that part of the resin substrate which is near to the recording layer as well as the recording layer and the reflective layer receive a high thermal stress and a subsequent physical stress. These stresses are thought to be higher in high-speed recording than in low-speed recording.

The reason for this may be as follows. In high-speed recording, it is necessary that a laser light for recording having a higher power than in low-speed recording should be used for decomposing the dye in order to attain a reduction in recording pulse. Actually, the power of the recording laser light generally used in 1-time velocity recording in a recordable DVD is about from 6 mW to 8 mW, whereas that in 8-times velocity recording (recording linear speed, 28 m/s) in a recordable DVD is from 13 mW to 18 mW. The recording layer and the reflective layer in high-speed recording are exposed to a higher temperature for a moment than in low-speed recording. Because of this, local thermal and physical stresses are higher in high-speed recording than in low-speed recording. For the same reason, it is thought that the shorter the wavelength of the laser light for recording is, i.e., the more a minimum mark length decreases to or below 0.4 μm, the higher the stresses are.

Such stresses are thought to be causative of deterioration in a durability test.

Namely, such stresses make the following problem more serious, for example, in a durability test in which it is held at a high temperature and a high humidity and thereby accelerate disk deterioration.

Namely, it is thought from investigations made by the present inventors that the dye present around parts in which the above stresses are occurred is more apt to separate at the interface of the substrate or reflective layer in high-speed recording than in low-speed recording as described above. This is at first because the recording layer comprising an organic substance has poor adhesion to the reflective layer comprising a metal, and because the above stresses are highly imposed on the recording layer and the reflective layer. In particular, there are cases where in the parts in which the dye has decomposed to a highest degree due to recording, the substrate and the reflective layer have undergone any shape change such as, e.g., a depression or bump or had a history including a shape change.

These "parts having a history including a change" such as a shape change, which have undergone high-speed recording accompanied with exposure to a higher temperature, have a shape or history different from that of the peripheral unrecorded parts. Because of this, there are cases where water which has infiltrated via the substrate pushes up the recording layer in those recording parts or the reflective layer overlying the recording parts to form defects. There also are cases where the reflective layer cannot conform to disk changes in stress and warpage with changing temperature and humidity and peels off. The resultant peeled parts of the reflective layer form a small defect, and the defect may form a burst defect or the like through corrosion, etc.

Although the explanation given above is on a recordable DVD, such problems are equally encountered not only in a DVD but in a CD-R.

The invention has been achieved in order to overcome those problems.

Namely, an object of the invention is to provide an optical recording medium which has satisfactory recording/reading characteristics in an application of high-speed recording and which shows high storage stability.

Means for Solving the Problems

The present inventors diligently made investigations.

As a result, they have found that the problems are effectively eliminated by forming two or more reflective layers as a component of an optical recording medium and satisfying specific relationships concerning thermal conductivity and thickness of the two or more layers. The invention has been thus achieved.

Namely, the invention provides an optical recording medium comprising a resin substrate, a recording layer comprising an organic dye, and a reflective layer, wherein the reflective layer comprises a first reflective layer and a second reflective layer in this order from a side close to the recording layer, the second reflective layer has a thermal conductivity lower than the thermal conductivity of the first reflective layer, and the first reflective layer has a film thickness larger than the film thickness of the second reflective layer.

According to the invention, by laminating a reflective layer satisfying a specific relationship concerning thermal conductivity, the stresses to be imposed on the recording layer and reflective layer in high-speed recording parts can be reduced as will be described later. Furthermore, by regulating the film thickness of the first reflective layer so as to be larger than the film thickness of the second reflective layer, the recording light can be inhibited from attenuating and satisfactory recording characteristics can be obtained without reducing recording sensitivity. Namely, a satisfactory optical recording medium having a high reflectance is obtained.

It is preferred in the invention that the thermal conductivity of the second reflective layer should be lower by at least 60 W/m·K than the thermal conductivity of the first reflective layer.

It is also preferred that the first reflective layer should comprise silver or copper as a main component.

It is furthermore preferred that an element as a main component of the first reflective layer should be different from the element as a main component of the second reflective layer.

In the invention, the second reflective layer preferably comprises as a main component a metal selected from the group consisting of Au, Ti, Ta, W, Mo, Cr, Ni, Zn, and Zr. It is especially preferred that the second reflective layer should comprise Au as a main component. That group of metals is preferred because those metals are excellent in corrosion resistance, etc.

In the invention, the first reflective layer preferably comprises silver as a main component because the remarkable effect of the invention is apt to be obtained. Namely, when the invention is applied to the case where the first reflective layer comprises silver as a main component, then not only the durability (reduced deterioration in high-temperature high-humidity durability test) of high-density or high-speed recording parts can be secured while using silver or a silver alloy, which has a low cost, but also problems such as an adhesive-layer deterioration by a photocatalytic reaction attributable to silver and a corrosion of the reflective layer due to the deteriorated adhesive can be improved.

It is preferred in the invention that the film thickness of the first reflective layer should be in the range of from 50 nm to 200 nm and the film thickness of the second reflective layer be in the range of from 0.5 nm to 60 nm. This is because by regulating the film thicknesses of the layers so as to be within those ranges, a sufficient reflectance and a sufficient radiating effect are secured and the stresses to be caused by a recording/reading light can be reduced.

In the invention, the recording layer preferably has a recording mark in which a minimum mark length is 0.4 μm or smaller. This is because the effect of the invention is more remarkable in such high-density recording, i.e., in an optical recording medium in which recording parts are irradiated with a higher recording power light than before and are exposed to a higher temperature than before.

In the invention, the optical recording medium preferably is capable of recording at a recording linear speed of 28 m/s or higher. This is because the effect of the invention is remarkable in an optical recording medium which comprises an organic dye and in which high-speed recording is conducted.

The reason for this is the same as that for the optical recording medium having the recording mark in which a minimum mark length is 0.4 μm or smaller.

ADVANTAGE OF THE INVENTION

According to the invention, a recordable optical recording medium for an archival application is hence obtained which has high quality and satisfactory storage stability when used in an application of high-density high-speed recording.

DESCRIPTION OF THE REFERENCE NUMERALS

Figure 1:
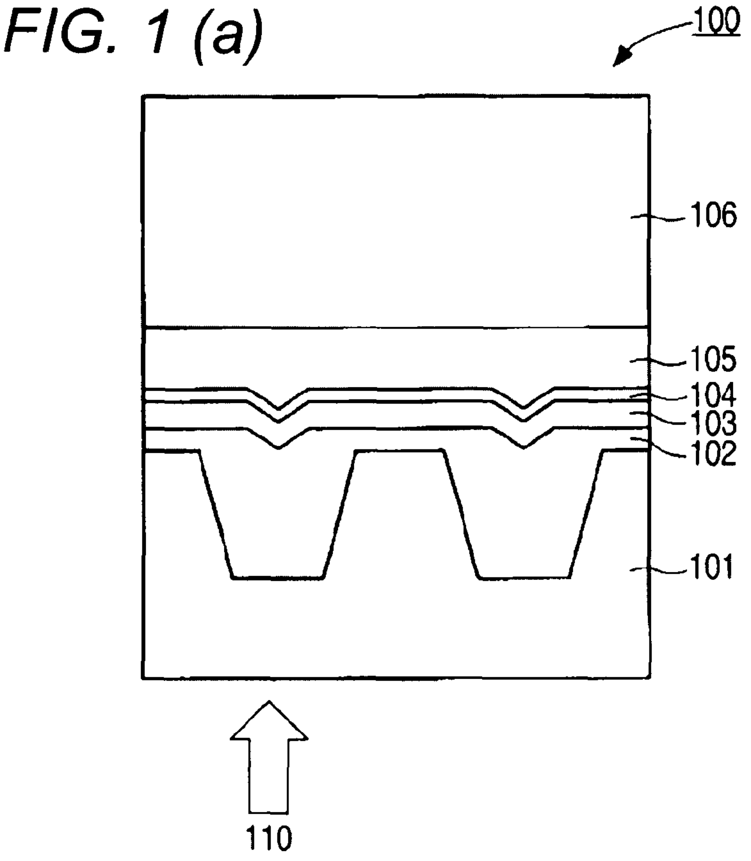
FIG. 1 (*a*) is a sectional view diagrammatically illustrating the constitution of an optical recording medium of the invention; and (b) is a sectional view diagrammatically illustrating the constitution of a conventional optical recording medium.
Figure 1:
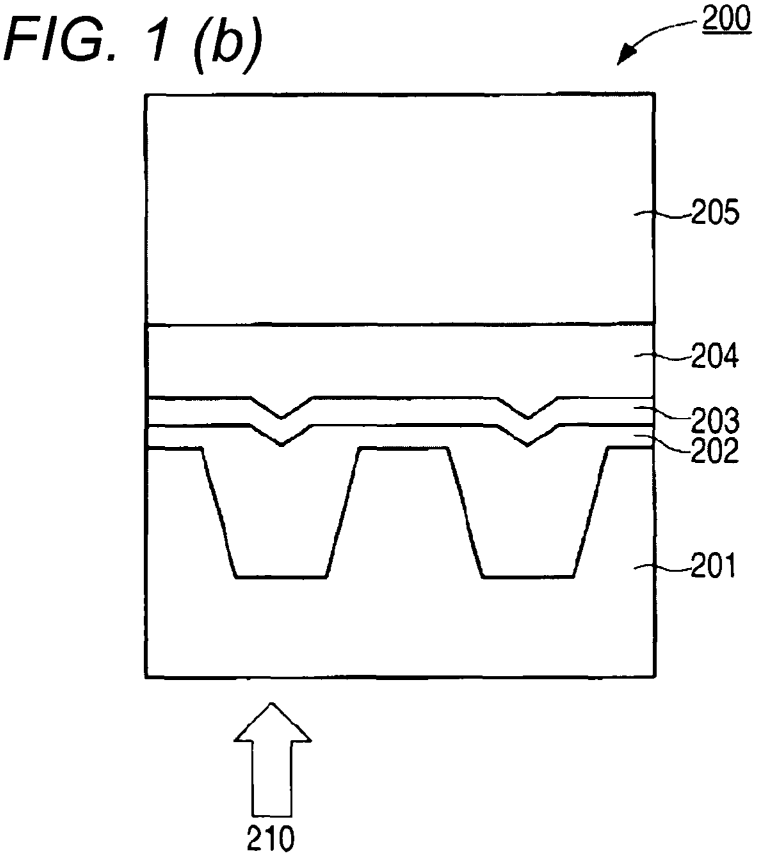

100, 200 optical recording medium
101, 201 resin substrate
102, 202 recording layer
103 first reflective layer
104 second reflective layer
105, 204 adhesive layer
106, 205 lamination substrate
110, 210 laser light
203 reflective layer

BEST MODE FOR CARRYING OUT THE INVENTION

Best modes for carrying out the invention (hereinafter referred to as embodiments of the invention) are explained below. The invention is not limited to the following embodiments, and various modifications can be made within the scope of the invention.

The optical recording medium of the invention preferably is a recordable medium in which recording is possible only once (Write-Once medium such as CD-R and DVD-R) or a rewritable medium in which recording and erasing can be repeatedly conducted (ReWritable medium such as CD-RW and DVD-RW). However, read-only media (ROM media such as CD-ROM and DVD-ROM) are not excluded. Application of the invention to the recordable medium is especially preferred because satisfactory storage stability can be exhibited in this case.

The optical recording medium of the invention is applicable to an optical recording media of the so-called substrate side incidence type which comprises a substrate, recording layer, and reflective layer laminated in this order and in which a laser light enters from the substrate side. The invention is applicable also to an optical recording media of the so-called film side incidence type which comprises a substrate, reflective layer, and recording layer laminated in this order and in which a laser light enters from the side opposite to the substrate.

Furthermore, the optical recording medium of the invention is applicable to an optical recording media comprising only one recording layer. The invention is applicable also to an optical recording media having two or more recording layers.

The optical recording medium of the invention is an optical recording medium comprising at least a resin substrate, a recording layer comprising an organic dye, and a reflective layer, wherein the reflective layer comprises a first reflective layer and a second reflective layer in this order from a side close to the recording layer, the second reflective layer has a thermal conductivity lower than the thermal conductivity of the first reflective layer, and the first reflective layer has a film thickness larger than the film thickness of the second reflective layer.

One feature of the invention resides in that the reflective layer comprises a first reflective layer and a second reflective layer in this order from a side close to the recording layer and that the thermal conductivity of the second reflective layer is lower than the thermal conductivity of the first reflective layer. By thus laminating the reflective layers having a specific relationship concerning thermal conductivity, the stresses to be imposed on the recording layer and reflective layers in high-speed recording parts can be reduced as will be described later.

Another feature of the invention resides in that the film thickness of the first reflective layer is regulated so as to be larger than the film thickness of the second reflective layer. By thus combining the two specific reflective layers with the relationship between these layers concerning film thickness, a recording light can be inhibited from attenuating and satisfactory recording characteristics can be obtained without reducing recording sensitivity. Furthermore, film stresses in the reflective layers can be regulated so as to be within an appropriate range and, hence, disk warpage can be regulated so as to be in an appropriate range. In addition, even when visible light is irradiated from the lamination substrate (hereinafter also referred to as dummy substrate) side over a prolonged period, the adhesive layer can be inhibited from deteriorating or yellowing, as will be described later.

The optical recording medium of the invention is explained below by reference to the drawings. FIG. 1 (*a*) is a sectional view diagrammatically illustrating the constitution of an optical recording medium of the invention. It shows the constitution of a recordable DVD disc of the substrate side incidence type having one recording layer. As shown in FIG. 1 (*a*), the optical recording medium 100 comprises: a disk-shaped light-transmitting resin substrate 101 in which a groove and land or a prepit is formed; a recording layer 102 comprising an organic dye, which is placed on an incidence side of the resin substrate 101 on which a laser light 110 enters; a first reflective layer 103; a second reflective layer 104; an adhesive layer 105; and a disk-shaped lamination substrate 106 in which a mirror surface or a groove and land or a prepit is formed. In this optical recording medium 100, optical information is recorded/read therein with a laser light 110 entering from the resin substrate 101 side.

Incidentally, FIG. 1 (*b*) is a sectional view diagrammatically illustrating the constitution of a conventional optical recording medium of the recordable DVD type. As shown in FIG. 1 (*b*), the optical recording medium 200 comprises: a disk-shaped light-transmitting resin substrate 201 in which a groove and land or a prepit are formed; a recording layer 202 comprising an organic dye, which is placed on an incidence side of the resin substrate 201 on which a laser light 210 enters; a reflective layer 203; an adhesive layer 204; and a lamination substrate 205. This conventional optical recording medium 200 has one reflective layer 203 unlike the optical recording medium 100 of the invention, and optical information is recorded/read therein with a laser light 210 entering from the resin substrate 201 side.

The optical recording medium of the invention will be explained below with respect to each component.

1. Reflective Layer

The first reflective layer 103 and the second reflective layer 104 are explained first. In the invention, the first reflective layer 103 which has a relatively high thermal conductivity and the second reflective layer 104 which has a relatively low thermal conductivity are used in combination.

Reasons for the combined use of such reflective layers are explained below in detail.

In conventional optical recording media of the recordable DVC type, a single layer comprising silver or copper as a main component is generally used as a reflective layer.

The use of such reflective layer comprising silver or copper as a main component between the recording layer and an adhesive layer has an advantage that a high reflectance is obtained with visible light ranging to a short-wavelength region around 400 nm. Furthermore, a cost reduction is possible because silver or copper is inexpensive. However, when such an optical recording medium is subjected to high-speed recording (e.g., 8-times velocity for a DVD-R), there are cases where significant deterioration is observed in a durability test. Specifically, there are cases where a jitter of recorded parts which is satisfactory before the test tends to deteriorate and where the test tends to result in an increase in PO error (Parity of Outer-code Error). Such deterioration is not observed when low-speed recording (1-time to 2-times velocity for a recordable DVD), which is in common use for the conventional evaluation of optical recording media before and after a durability test, is conducted and the same aging time (durability test treatment period) is passed. Such deterioration is thought to indicate that adhesion between the recording layer and the reflective layer is unsatisfactory especially under severe conditions in high-speed recording.

Incidentally, in ordinary DVD inspections, a PI error (Parity of Inner-code Error) in eight ECCs and the above PO error are known as an error detectable with a general DVD inspector.

These are based on the contents described in an article or the like for a recordable DVD written standard "DVD Specifications for Recordable Disc for General Ver. 2.0", Chapter 3.2.7 "ECC Block Configulation".

The PI error is such an error that when one line in one ECC block has an error of 1 byte or more, this case is counted as one; and the error can be restored with internal parity. On the other hand, the PO error is such an error that when one line in one ECC block contains an error of 5 bytes or more even after correction with parity, this case is counted as one. The term ECC herein means error correction code.

The present inventors first thought that, as the causes of error occurrence under severe conditions in high-speed recording, one factor is the thermal stress which the recording layer receives upon irradiation with a laser for recording.

Such thermal stress is considerably high at the interface between the recording layer and the reflective layer. On the other hand, with respect to the interface between the reflective layer and the adhesive layer, the stress is thought to be lower than that to be imposed on the interface between the recording layer and the reflective layer, because the reflective layer has a relatively high radiating effect. However, since the adhesive layer has an exceedingly large film thickness and is less apt to heat up, the reflective layer has a thickness-direction temperature gradient which highly steeply declines toward the adhesive layer, which hardly heats up. Consequently, the interface between the recording layer and the reflective layer considerably differs in thermal stress from the interface between the reflective layer and the adhesive layer. Accordingly, one of the ideas of the invention is that the excessive remaining of a thermal stress after high-speed recording may be inhibited by placing a second reflective layer having a low thermal conductivity between the reflective layer and the adhesive layer to reduce the difference in stress.

Based on the consideration given above, the present inventors determined an object of the invention, which is to form recording parts in which thermal stress in high-speed recording is reduced, which have satisfactory high-speed recording signal reading characteristics, and which give satisfactory results in a durability test.

The inventors therefore thought that it is preferred that not a dielectric or a metallic reflective layer having a higher thermal conductivity than the first reflection layer but a reflective layer having a lower thermal conductivity than the first reflective layer should be laminated on the first reflective layer for the reason given above. The invention has been thus achieved. In case where a reflective layer is constituted of a single layer made of only a material having a low thermal conductivity, this reflective layer generally has a reduced reflectance. This leads to cases where a thermal energy necessary for recording cannot be sufficiently obtained or cases where reading with a general apparatus is impossible.

It is generally known that a metal having a higher thermal conductivity tend to have a higher reflectance. This tendency is remarkable especially at 600 nm to 650 nm. Consequently, the second reflective layer according to the invention can be considered as a layer having a lower reflectance than the first reflective layer.

Furthermore, as a result of investigations made by the present inventors, it was found that in the case that the reflective layer is a single layer comprising silver as a main component, long-term irradiation with visible light from the dummy substrate side alters the adhesive layer and this alteration of the adhesive layer may result in corrosion of the reflective layer containing silver as a main component and in an increase in PI errors. It was further found that long-term irradiation with visible light from the dummy substrate side may yellow the adhesive layer, i.e. alter the adhesive layer, resulting in deterioration. The deterioration in each of these cases is thought to be attributable to the photocatalytic action derived from the silver.

Such problems posed by long-term irradiation with visible light are improved by placing a layer of a metal other than silver or of an alloy as a second reflective layer to prevent the adhesive layer from being in contact with the silver.

Furthermore, by placing the second reflective layer according to the invention having a lower reflectance than the reflective layer comprising silver or copper as a main component, the reflection toward the adhesive layer of the visible light entering from the dummy substrate side is attenuated. As a result, it is thought that the adhesive layer deterioration described above is further inhibited.

In this description, the "thermal conductivity" used is a value of a thermal-conductivity ratio determined at 300 K and given in Kittel, *Kotai Butsurigaku Nyuumon Joukan,* 6th edition, p 117, Table 1 "Debye Temperature and Thermal Conductivity". The values of thermal conductivity of major materials given in that table are shown in Table 1 below.

TABLE 1

| | Thermal conductivity at 300 K (W/m · K) | | Thermal conductivity at 300 K (W/m · K) |
|---|---|---|---|
| C | 129 | Ru | 117 |
| Mg | 156 | Rh | 150 |
| Al | 237 | Pd | 72 |
| Si | 148 | Ag | 429 |
| Cr | 94 | Ta | 58 |
| Fe | 80 | Zr | 23 |
| Co | 100 | Sn | 67 |
| Ni | 91 | W | 174 |
| Cu | 401 | Os | 88 |
| Zn | 116 | Ir | 147 |
| Mo | 138 | Pt | 72 |
| Ti | 22 | Au | 317 |

Several methods for determining the thermal conductivity of an actual thin film have been reported. However, these experiments necessitate a special apparatus (e.g., a thin-film thermal constant measuring apparatus based on optical AC method) or a producing method of a special sample. These methods hence have not spread generally, and an excess labor is frequently required for the measurement. Because of this, the thermal conductivities of bulk in general use are employed in the invention. However, in the case of using a metal-containing compound or the like, the thermal conductivity of the compound can be determined, for example, with the above apparatus.

In the case where a reflective layer is constituted of two or more components as in the case of an alloy or the like, a value of the thermal conductivity is determined from values obtained by multiplying each of the thermal conductivities of the bulk by each of the proportions (atom %) of the components, as shown below. For example, the thermal conductivity of an alloy composed of Ag of 95 atom % and Ti of 5 atom % is determined from the thermal conductivity of bulk of Ag (429 W/m·K) and the thermal conductivity of bulk of Ti (22 W/m·K), i.e., calculated as $429\times0.95+22\times0.05=408.7$ W/m·K. In this way, e.g., in ternary and quaternary systems, the thermal conductivity thereof is calculated in the same manner. Consequently, even in the case of an optical recording medium in a completed disk form, the thermal conductivity in the invention can be calculated in that manner so long as the composition of the reflective layer is known.

The materials of the first reflective layer 103 and second reflective layer 104 are explained below in detail.

The material constituting the first reflective layer 103 is not limited. However, the material preferably comprises silver or copper as a main component. The term "comprises silver or copper as a main component" in the invention means that the metal(s) constituting the first reflective layer 103 include copper or silver in an amount of 50 atom % or larger.

In particular, it is preferred that copper or silver should be contained in an amount of 80 atom % or larger, especially 90 atom % or larger, from the standpoint of more effectively producing the effect of the invention.

Namely, the first reflective layer 103 may be a reflective layer made of single metal of silver or copper, or may be a reflective layer made of an alloy comprising silver or copper as a main component. In particular, the first reflective layer 103 preferably is a reflective layer made of silver or an alloy comprising silver as a main component because the effect of the invention is apt to be obtained more remarkably in this case as described above.

The second reflective layer 104 is a reflective layer having a lower thermal conductivity than the first reflective layer 103. The material constituting the second reflective layer 104 is not particularly limited so long as it has a lower thermal conductivity than the first reflective layer. However, it is preferred that this material should differ from the material constituting the first reflective layer 103 in the element serving as a main component. Namely, when a material comprising silver or copper as a main component is used as the first reflective layer 103, then the second reflective layer 104 preferably comprises as a main component an element other than silver and copper. The term "comprises as a main component an element other than silver and copper" herein means that a metal other than silver and copper is contained in an amount of 50 atom % or larger based on all metals constituting the second reflective layer 104. However, in the case where a material comprising silver as a main component is used as the first reflective layer 103, a material comprising copper as a main component can be used as the second reflective layer 104.

The material constituting the second reflective layer 104 preferably comprises as a main component a metal selected from the group consisting of Au, Ti, Ta, W, Mo, Cr, Ni, Zn, and Zr from the standpoint of high corrosion resistance. Especially preferably, the material comprises Au as a main component. The term "comprises a metal as a main component" the metal in the invention means that the above metal is contained in an amount of 50 atom % or larger based on all metals constituting the second reflective layer 104. In particular, from the standpoint of more effectively producing the effect of the invention, it is preferred that the metal be contained in an amount of 80 atom % or larger, especially 90 atom % or larger.

Namely, the second reflective layer 104 may be a reflective layer made of the single metal of the above metal, or may be a reflective layer made of an alloy comprising the above metal as a main component. The second reflective layer 104 may also be made of a metal-containing compound in which the above metal is a main component.

The difference between the thermal conductivity of the second reflective layer 104 and the thermal conductivity of the first reflective layer 103 is not limited. However, it is desirable that the thermal conductivity of the second reflective layer 104 should be lower than the thermal conductivity of the first reflective layer 103 preferably by 60 W/m·K or higher, more preferably by 80 W/m·K or higher, even more preferably by 100 W/m·K or higher. So long as the difference between the thermal conductivity of the second reflective layer 104 and the thermal conductivity of the first reflective layer 103 is within that range, the effect of improving durability is satisfactory. That range is therefore desirable.

There is no upper limit on the difference between the thermal conductivity of the second reflective layer 104 and the thermal conductivity of the first reflective layer 103. However, the difference between these is generally 400 W/m·K or smaller.

The thermal conductivity of the first reflective layer 103 is not limited. However, the thermal conductivity thereof is preferably 350 W/m·K or higher, more preferably 400 W/m·K or higher, even more preferably 420 W/m·K or higher, and is preferably 450 W/m·K or lower. So long as the thermal conductivity of the first reflective layer 103 is within that range, satisfactory recording characteristics tend to be obtained with optical recording apparatus which have already spread. That range is therefore preferred.

The thermal conductivity of the second reflective layer 104 is not limited. However, the thermal conductivity thereof is preferably 405 W/m·K or lower, more preferably 340 W/m·K or lower, and is preferably 20 W/m·K or higher. So long as the thermal conductivity of the second reflective layer 104 is within that range, the effect of improving durability is satisfactory. That range is therefore preferred.

A combination of the film thickness of the first reflective layer 103 and the film thickness of the second reflective layer 104 is described below. A feature of the invention resides in that the film thickness of the first reflective layer 103 is larger than the film thickness of the second reflective layer 104. By regulating the film thickness of the first reflective layer 103 so as to be larger than the film thickness of the second reflective layer 104, the effect of reducing the stresses to be imposed on the second reflective layer 104 can be sufficiently obtained without attenuating the intensity of a recording/reading light.

There is no limitation on thickness ratio so long as the film thickness of the first reflective layer 103 is larger than the film thickness of the second reflective layer 104. However, the film thickness of the second reflective layer 104 is preferably 0.01 or larger, more preferably 0.05 or larger, even more preferably 0.1 or larger, and is generally desirably smaller than 1, preferably 0.8 or smaller, more preferably 0.6 or smaller, based on the film thickness of the first reflective layer 103.

The film thickness of the first reflective layer 103 is preferably 50 nm or larger, more preferably 60 nm or larger.

By regulating the film thickness of the first reflective layer 103 so as to be the above range or larger, a sufficient reflectance and a sufficient radiating effect can be secured. The upper limit of the film thickness of the first reflective layer 103 is preferably 200 nm, and is more preferably 150 nm or smaller so as to prevent the sputtering film deposition period from being unnecessarily prolonged. By regulating the film thickness of the first reflective layer 103 so as to be the above range or smaller, this first reflective layer can be regulated in a sputtering film deposition period within a proper range. As a result, the influence of film stress can be reduced and disk warpage can be maintained within a proper range.

The film thickness of the second reflective layer 104 is preferably 0.5 nm or larger, more preferably 1 nm or larger, even more preferably 10 nm or larger, especially preferably 20 nm or larger. The film thickness of the second reflective layer 104 is preferably 60 nm or smaller, more preferably 50 nm or smaller. By regulating the film thickness of the second reflective layer 104 so as to be within that range, the stresses to be caused by a recording/reading light can be reduced. In addition, the second reflective layer having such a film thickness can serve as a barrier layer for the adhesive layer to prevent from the silver-derived photocatalytic action upon the long-term light irradiation from the dummy side. Thus, sufficient corrosion resistance which inhibits the yellowing of the adhesive layer and deterioration of the first reflective layer can be secured.

The total film thickness of the first reflective layer 103 and second reflective layer 104 is preferably 200 nm or smaller, more preferably 190 nm or smaller, so as to prevent the sputtering film deposition period from being unnecessarily prolonged. From the standpoint of stabilizing a jitter to improve more, the total film thickness of the first reflective layer 103 and second reflective layer 104 is preferably 160 nm or smaller (see Table 4). From the standpoint of disk warpage, the total film thickness of the first reflective layer 103 and second reflective layer 104 is preferably smaller, and is more preferably 150 nm or smaller. Furthermore, the total film thickness of the first reflective layer 103 and second reflective layer 104 is preferably 50 nm or larger, more preferably 60 nm or larger. The total thickness thereof is even more preferably 80 nm or larger because a sufficient quantity of reflected light is obtainable and stable film deposition is possible. By regulating the total film thickness of the first reflective layer 103 and second reflective layer 104 so as to be within that range, a sufficient reflectance of the disk can be secured and disk warpage can be kept satisfactory.

2. Resin Substrate

The resin substrate 101 is explained below. In the case of an optical recording medium of the substrate side incidence type, the resin substrate 101 is necessary to be light-transmitting and desirably has excellent optical properties such as a low birefringence rate. Furthermore, it is desirable that the material should have excellent moldability, e.g., ease of injection molding. The material desirably further has low hygroscopicity. In addition, the material desirably has shape stability so as to enable the optical recording medium 100 to have some degree of rigidity.

Such materials are not particularly limited. Examples thereof include an acrylic-based resin, a methacrylic-based resin, a polycarbonate resin, a polyolefin-based resin (in particular, amorphous polyolefins), a polyester-based resin, a polystyrene resin, an epoxy resin, and a glass. Also usable are substrates obtained by placing a resin layer made of a radiation-curable resin such as a photocurable resin on a base such as a glass.

Of these, polycarbonates are preferred from the standpoints of optical properties, high productivity such as moldability, cost, low hygroscopicity, shape stability, etc. From the standpoints of chemical resistance, low hygroscopicity, etc., amorphous polyolefins are preferred. From the standpoints of high-speed response, etc., a glass substrate is preferred.

A groove width of the resin substrate 101 is generally 2T/10 or larger, preferably 3T/9 or larger, provided that T is track pitch. So long as the groove width thereof is within this range, a sufficient reflectance can be secured. For example, when the track pitch is 740 nm, the groove width of the resin substrate 101 is generally 148 nm or larger, preferably 246 nm or larger. However, the groove width of the resin substrate 101 is generally 7T/10 or smaller, preferably 6T/10 or smaller.

For example, when the track pitch is 740 nm, the groove width of the light-transmitting resin substrate 101 is generally 518 nm or smaller, preferably 444 nm or smaller. Such a groove width is preferred because it brings about satisfactorily a transferability property of groove shape.

The groove depth of the resin substrate 101 is generally $\lambda/15$ or lager, provided that $\lambda$ is a wavelength of a recording/reading light. Such a groove depth is preferred because a sufficient reflectance and a sufficient groove signal can be secured. The groove depth thereof is more preferably $\lambda/12$ or larger. For example, when the recording/reading light has a wavelength (recording/reading wavelength) $\lambda$ of 660 nm, the groove depth of the resin substrate 101 is generally 44 nm or larger, preferably 55 nm or larger. However, the upper limit of the groove depth of the resin substrate 101 is generally preferably up to $2\lambda/5$ because it brings about a satisfactory transferability property of groove shape. The upper limit thereof is more preferably up to $2\lambda/7$. For example, when the recording/reading wavelength is 660 nm, it is generally 264 nm or smaller, preferably 188.6 nm or smaller.

The thickness of the resin substrate 101 is not particularly limited. However, in the case where the optical recording medium is of the substrate side incidence type, the thickness of the resin substrate 101 is generally in the range of from 0.55 mm to 0.65 mm.

3. Recording Layer

The recording layer 102 is explained below. The organic dye contained in the recording layer 102 preferably is a dye compound which has a maximum absorption wavelength λmax in a visible to near-infrared region of about 350 to 900 nm and is suitable for recording with a blue to near-microwave laser.

More preferred is a dye suitable for recording with a red laser having a wavelength of about 620 to 690 nm (e.g., 635 nm, 660 nm, or 680 nm) such as those used for a recordable DVD, with a so-called blue laser having a wavelength of, e.g., 405 nm or 515 nm, or the like. This is because the effect of the invention is remarkable in optical recording media which comprises an organic-dye layer having a low thermal conductivity and are for use in higher-density recording or higher-speed recording, as already described.

It is preferred that the recording layer 102 should have a recording mark in which a minimum mark length is 0.4 μm or smaller.

The dye to be used in the recording layer 102 is not particularly limited. However, an organic dye material is generally used. Examples of the organic dye material include a macrocyclic azanulene-based dye (e.g., a phthalocyanine dye, a naphthalocyanine dye, and a porphyrin dye), a pyrromethene-based dye, a polymethine-based dye (e.g., a cyanine dye, a merocyanine dye, and a squarylium dye), an anthraquinone-based dye, an azulenium-based dye, a metal-containing azo-based dye, and a metal-containing indoaniline-based dye. Of these, a metal-containing azo-based dye is preferred because it has excellent recording sensitivity and is excellent in durability and light resistance. One of those dyes may be used alone, or a mixture of two or more thereof may be used.

Besides the dye, other ingredients may be contained in the recording layer 102.

For example, the recording layer 102 may comprise a transition metal chelate compound (e.g., an acetylacetonate chelate, bisphenyldithiol, salicylaldehyde oxime, or bisdithio-α-diketone) as a singlet-state oxygen quencher for improving the stability and light resistance of the recording layer and a recording sensitivity improver such as, e.g., a metal-based compound for improving the recording sensitivity.

The term "metal-based compound" herein means a compound in which a metal such as, e.g., a transition metal has been incorporated in the form of an atom, ion, cluster, etc. Examples thereof include organometallic compounds such as an ethylenediamine-based complex, an azomethine-based complex, a phenylhydroxyamine-based complex, a phenanthroline-based complex, a dihydroxyazobenzene-based complex, a dioxime-based complex, a nitrosoaminophenol-based complex, a pyridyltriazine-based complex, an acetylacetonate-based complex, a metallocene-based complex, and a porphyrin-based complex. Although the metal atom is not particularly limited, it is preferably a transition metal.

Furthermore, in the recording layer 102, a binder, leveling agent, antifoamer, and other ingredients may also be used in combination according to need. Preferred examples of the binder include polyvinyl alcohol, polyvinylpyrrolidone, nitrocellulose, cellulose acetate, a ketone-based resin, an acrylic-based resin, a polystyrene-based resin, an urethane-based resin, polyvinyl butyral, polycarbonates, and polyolefins.

Methods for the film deposition of the recording layer 102 are not particularly limited. Examples thereof generally include techniques in common use for thin-film formation method, such as vacuum deposition method, sputtering method, doctor blade method, casting method, spin coating method, and dipping method. However, from the standpoints of suitability for mass production and cost, wet film formation techniques such as spin coating method are preferred. From the standpoint of obtaining an even recording layer, vacuum deposition method is preferred.

In the case of film deposition by spin coating method, the rotation number is preferably 10 to 15,000 rpm. After application by spin coating, a heat treatment is generally conducted to remove a solvent. In the case of forming a recording layer by a method employing a coating, such as the doctor blade method, casting method, spin coating method, or dipping method, any coating solvent which does not attack the resin substrate may be used without particular limitations. Examples thereof include a ketone alcohol-based solvent such as diacetone alcohol and 3-hydroxy-3-methyl-2-butanone; a cellosolve-based solvent such as methyl cellosolve and ethyl cellosolve; a chain hydrocarbon-based solvent such as n-hexane and n-octane; a cyclic hydrocarbon-based solvent such as cyclohexane, methylcyclohexane, ethylcyclohexane, dimethylcyclohexane, n-butylcyclohexane, tert-butylcyclohexane, and cyclooctane; a perfluoroalkyl alcohol-based solvent such as tetrafluoropropanol, octafluoropentanol, and hexafluorobutanol; and a hydroxycarboxylic acid ester-based solvent such as methyl lactate, ethyl lactate, and methyl 2-hydroxyisobutyrate.

The heat treatment for removing such a solvent is generally conducted at a temperature slightly lower than the boiling point of the solvent used, from the standpoint of removing the solvent with a simple apparatus. In general, the heat treatment is conducted at a temperature in the range of 60° C. to 100° C. Methods for the heat treatment are not particularly limited. Examples thereof include a method in which a solution containing a dye is applied to the resin substrate 101 to form a film in order to form the recording layer 102, then that is held at a given temperature for a given time (which is generally 5 minutes or longer, preferably 10 minutes or longer, but is generally 30 minutes or shorter, preferably 20 minutes or shorter). Also usable is a method in which the resin substrate 101 is heated by irradiation with infrared or far-infrared ray for a short time (e.g., from 5 seconds to 5 minutes).

In the case of vacuum deposition, the recording layer 102 is formed, for example, by placing recording-layer ingredients comprising an organic dye, and various optional additives according to need in a crucible disposed in a vacuum vessel, evacuating inside the vacuum vessel with an appropriate vacuum pump to about $10^{-2}$ to $10^{-5}$ Pa, and then heating the crucible to vaporize the recording-layer ingredients and deposit the ingredients on a resin substrate placed so as to face the crucible.

4. Adhesive Layer

The adhesive layer 105 is explained below. This adhesive layer 105 may comprise a single layer or two or more layers. Namely, the adhesive layer 105 comprising an ultraviolet-curable resin may be placed on the second reflective layer 104 in a thickness of several micrometers by spin coating and another adhesive layer 105' is placed thereon, and then a lamination substrate 106 is placed.

The resin constituting the adhesive layer 105 preferably has a modulus of elasticity at around 25° C. of generally 1,000 MPa or higher, preferably 2,000 MPa or higher, more preferably 3,000 MPa or higher. By using the resin having a modulus of elasticity of 1,000 MPa or higher to constitute the adhesive layer 105, a laminated disk is obtained which has a satisfactory adhesion property and a satisfactory mechanical property. However, the upper limit of the modulus of elasticity is generally 6,000 MPa or lower. By using the resin having a modulus of elasticity of 6,000 MPa or lower, the adhesive layer 105 can be formed by a solution method, e.g., coating, which is industrially advantageous. When the resin constituting the adhesive layer 105 has a modulus of elasticity within that range, a laminated disk having a satisfactory mechanical property is obtained.

The adhesive layer 105 is required to have a thickness of generally 5 μm or larger, preferably 10 μm or larger.

Too large thicknesses thereof are undesirable for the following reasons. In case where this layer is too thick, ultraviolet curing requires much time to apply excess light energy to the dye. This not only may cause deterioration but also may cause disk warpage, etc. In view of these, the adhesive layer 105 generally preferably has a thickness of 100 μm or smaller.

Specific examples of materials for constituting the adhesive layer 105 are explained below.

Examples of materials for constituting the adhesive layer 105 include a thermoplastic resin, a thermosetting resin, an electron beam-curable resin, and an ultraviolet-curable resin (including ones of a delayed curing type). The material for constituting the adhesive layer 105 may be suitably selected from these. In the case of the thermoplastic resin, thermosetting resin, or the like, the adhesive layer can be formed by optionally diluting with an appropriate solvent to prepare a coating fluid and applying and drying (heating) this coating fluid. In the case of the ultraviolet-curable resin, the adhesive layer can be formed by applying the resin as it is or applying a coating fluid prepared by dissolving in an appropriate solvent, coating this coating fluid thereon, placing a lamination substrate 106 thereon, and then irradiating the resin layer with ultraviolet. Those materials may be used alone or as a mixture thereof.

For forming the adhesive layer 105, use may be made of, for example, a method employing a coating fluid, such as, e.g., spin coating or casting. Of these, the spin coating method is preferred. A high-viscosity resin is coated also by screen printing or the like to perform the formation. In the case of using an ultraviolet-curable resin, this resin preferably is one which is liquid at 20° C. to 40° C. This is because such a resin is applicable without using a solvent and, hence, brings about satisfactory productivity. It is preferred that the viscosity of the coating fluid be regulated to from 20 mPa·s to 1,000 mPa·s.

Of the materials usable for constituting the adhesive layer 105, the ultraviolet-curable resin is preferred because it has high transparency and a short curing time, which is advantageous in production. Examples of the ultraviolet-curable resin include a radical type ultraviolet-curable resin and a cationic type ultraviolet-curable resin, and either of these can be used.

As the radical type ultraviolet-curable resin, use may be made of a composition comprising an ultraviolet-curable compound and a photopolymerization initiator as essential components.

As the ultraviolet-curable compound can be used a monofunctional (meth)acrylate and a polyfunctional (meth)acrylate as a polymerizable monomer ingredient. Each of these monomers may be used alone, or two or more thereof may be used in combination. In this description, "acrylate" and "methacrylate" are inclusively referred to as "(meth)acrylate".

Examples of the monofunctional (meth)acrylate include (meth)acrylate having, as a substituent group, a group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl, isobornyl, dicyclopentanyl, dicyclopentenyl, dicyclopentenyloxyethyl, etc.

Examples of the polyfunctional (meth)acrylate include di(meth)acrylates of 1,3-butylene glycol, 1,4-butanediol, 1,5-pentanediol, 3-methyl-1,5-pentanediol, 1,6-hexanediol, neopentyl glycol, 1,8-octenediol, 1,9-nonanediol, tricyclodecane dimethanol, ethylene glycol, polyethylene glycol, propylene glycol, dipropylene glycol, tripropylene glycol, and polypropylene glycol, and di(meth)acrylate of tris(2-hydroxyethyl) isocyanurate and the like.

Examples thereof further include a di(meth)acrylate of a diol obtained by causing 1 mol of neopentyl glycol to add 4 mol or more of ethylene oxide or propylene oxide, a di(meth) acrylate of a diol obtained by causing 1 mol of bisphenol A to add 2 mol of ethylene oxide or propylene oxide, a di- or tri(meth)acrylate of a triol obtained by causing 1 mol of trimethylolpropane to add 3 mol or more of ethylene oxide or propylene oxide, a di(meth)acrylate of a diol obtained by causing 1 mol of bisphenol A to add 4 mol or more of ethylene oxide or propylene oxide, trimethylolpropane tri(meth)acrylate, pentaerythritol tri(meth)acrylate, a poly(meth)acrylate of dipentaerythritol, ethylene oxide-modified phosphoric acid (meth)acrylate, and ethylene oxide-modified alkylated phosphoric acid (meth)acrylate.

Examples of one usable in combination with those polymerizable monomers include a polymerizable oligomer such as polyester (meth)acrylate, polyether (meth)acrylate, epoxy (meth)acrylate, and urethane (meth)acrylate.

On the other hand, the photopolymerization initiator preferably is a molecule cleavage type photopolymerization initiator or a hydrogen abstraction type photopolymerization initiator.

Examples of the molecule cleavage type photopolymerization initiator include benzoin isobutyl ether, 2,4-diethylthioxanthone, 2-isopropylthioxanthone, benzil, 2,4,6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-trimethylpentylphosphine oxide. Such an initiator may be used in combination with 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one, 2-methyl-1-(4-methylthiophenyl)-2-morpholinopropan-1-one, and the like.

Examples of the hydrogen abstraction type photopolymerization initiator include benzophenone, 4-phenylbenzophenone, isophthalphenone, and 4-benzoyl-4'-methyldiphenyl sulfide.

A sensitizer can be used in combination with those photopolymerization initiators. Examples of the sensitizer include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone.

On the other hand, examples of the cationic type ultraviolet-curable resin include an epoxy resin comprising a photoinitiator of the cationic polymerization type. Examples of the epoxy resin include a bisphenol A/epichlorohydrin type, alicyclic epoxy, a long-chain aliphatic type, a brominated epoxy resin, a glycidyl ester type, a glycidyl ether type, and a heterocyclic type. The epoxy resin to be used preferably is one in which the content of free chlorine and a chlorine ion is low. The amount of chlorine is preferably 1% by weight or smaller, more preferably 0.5% by weight or smaller.

The proportion of the cationic polymerization type photoinitiator may be in the range of from generally 0.1 part by weight or larger, preferably 0.2 parts by weight or larger, and generally 20 parts by weight or smaller, preferably 5 parts by weight or smaller, per 100 parts by weight of the cationic type ultraviolet-curable resin. For the purpose of more effectively utilizing those wavelengths for an ultraviolet light source which are in the near ultraviolet region and visible region, a known light sensitizer can be used in combination.

Examples of the light sensitizer in this case include anthracene, phenothiazine, benzyl methyl ketal, benzophenone, and acetophenone.

Other additives such as a heat polymerization inhibitor, an antioxidant represented by such as a hindered phenol, hindered amine, or phosphite, a plasticizer, and a silane coupling agent represented by such as an epoxysilane, mercaptosilane, or (meth)acrylsilane may be incorporated into the ultraviolet-curable resin according to need for the purpose of improving various properties. Such additives which have excellent solubility in the ultraviolet-curable compound and do not inhibit ultraviolet transmission are selected and used.

Preferred of the ultraviolet-curable resin is cationic type ultraviolet-curable resin which have the property of lowly scattering light and which have a low viscosity and are applicable by spin coating. Furthermore, it is preferred to use a radical type ultraviolet-curable resin because it can be selected from many kinds and has a high degree of freedom of compounding ratio and composition and because there is no need of taking account of curing inhibition by oxygen when the adhesive layer 105 has a thickness of 10 μm or larger.

Information such as, e.g., address information, information about the kind of the medium, recording pulse conditions, and optimal recording power can be recorded in the optical recording medium of the invention. As the form in which such information is recorded, use may be made of, for example, the LPP or ADIP format described in standards for a recordable DVD.

5. Lamination Substrate

The lamination substrate 106 is explained below. The material and the like of the lamination substrate 106 are not particularly limited, and may be the same as those described above under "2. Resin Substrate". Explanations thereon are hence omitted here.

The film thickness of the lamination substrate 106 is not particularly limited. However, in the case where the optical recording medium is of the substrate side incidence type, the film thickness of the substrate 106 is generally in the range of from 0.55 mm to 0.65 mm.

6. Optical Recording Medium

The optical recording medium 100 of the invention comprises the reflective layer, resin substrate, and recording layer described above and optionally further comprises the adhesive layer and lamination substrate described above. In the case of a DVD disc, the recording medium preferably has the adhesive layer and the lamination substrate. However, in the case of a CD disc such as, e.g., CD-R, the adhesive layer and the lamination substrate can be omitted and replaced by a protective layer. As the protective layer in the CD disc, an ultraviolet-cured resin or the like can be used.

In the case where the optical recording medium 100 of the invention has two or more recording layers, the constitution thereof is not particularly limited. In general, however, this recording medium has an interlayer made of, e.g., a resin between the recording layers. Furthermore, a reflective layer is generally placed for each recording layer either directly thereon or through another layer. Consequently, there are cases where two or more reflective layers are present for the respective recording layers. In such cases, the recording medium may be one in which at least one of the reflective layers is a reflective layer having the constitution described above.

It is preferred that the optical recording medium 100 of the invention should be capable of recording at a recording linear speed of 28 m/s or higher. This is because the effect of the invention is remarkable in an optical recording medium which comprises an organic dye and in which high-speed recording is conducted.

The term "capable of recording" as used in the invention means that in the case of a DVD disc, a signal normally readable with an ordinary DVD disc reader can be recorded therein, or means that recorded parts attaining reading characteristics conforming to DVD standards can be formed therein. In the case of a CD disc, that term means that a signal normally readable with an ordinary CD reader can be recorded in the recording medium, or means that recorded parts attaining reading characteristics conforming to CVD standards can be formed therein.

EXAMPLES

Embodiments of the invention will be explained below in more detail by reference to Examples (Experimental Examples).

The embodiments should not be construed as being limited to the following Examples (Experimental Examples) unless they depart from the spirit thereof.

(1) Experimental Examples for Recordable DVD

Experimental Examples in the case of a recordable DVD are shown below.

Example 1

Preparation of Optical Recording Medium

First, a polycarbonate was injection-molded with a nickel stamper having a groove formed in the surface thereof to thereby form a resin substrate which had a diameter of 120 mm and a film thickness of 0.60 mm and had a groove having a pitch of 0.74 μm, width of 320±50 nm, and depth of 150±25 nm. A tetrafluoropropanol solution (concentration, 1.5% by weight) of a mixture of dye A and dye B (dye A/dye B=60% by weight/40% by weight) which were metal-containing azo dyes respectively represented by the following chemical formulae, as an organic dye compound, was prepared. This was dropped onto the resin substrate and subjected to spin coating. Thereafter, the coating film was dried at 70° C. for 30 minutes to form a recording layer. In the groove part of the resin substrate, the recording layer had a film thickness of about 80 nm and a value of OD (optical density) as measured at a wavelength of about 595 nm with ETA-RT, manufactured by ETA-Optik GmbH, of 0.81.

[Ka-1]

Dye A

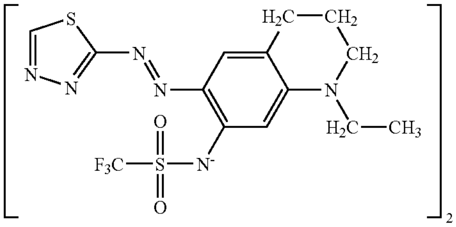

[Ka-2]

Dye B

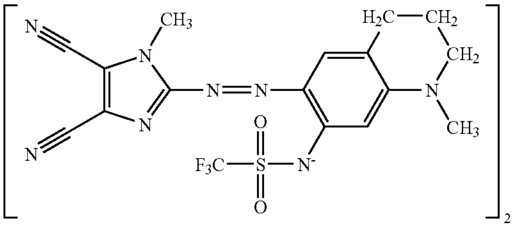

As soon as possible after the formation of the recording layer, a sputtering film of pure silver (thermal conductivity, 429 W/m·K (300 K)) was deposited in a film thickness of 100 nm as a first reflective layer on the recording layer. Furthermore, a sputtering film of pure gold (thermal conductivity, 317 W/m·K (300 K)) was deposited in a film thickness of 50 nm as a second reflective layer.

Conditions for the sputtering are as follows.

Pure silver: deposition power, 3.8 kW; voltage, 640 to 650 V; current, 4.6 to 5.2 A; argon flow rate, 25 sccm; achievement degree of vacuum, $1.0\times10^{-2}$ mbar or lower Gold: deposition power 2.6 kW; voltage, 640 to 650 V; current, 4.6 to 5.2 A; argon flow rate, 25 sccm; achievement degree of vacuum, $1.0\times10^{-2}$ mbar or lower In Examples 2 to 8 and Comparative Examples 1 to 7, which will be given later, films were deposited so as to result in desired film thicknesses by suitably changing the targets and sputtering conditions.

<Preparation of Laminated Disk>

The second reflective layer of the disk prepared by the method described above was coated with an ultraviolet-curable resin (radical type ultraviolet-curable resin DVD750, manufactured by Nippon Kayaku Co., Ltd.: modulus of elasticity, 3,100 MPa (25° C.); glass transition temperature Tg, 98° C.). A spin coating rotation speed was regulated, with a lamination substrate (mirror-surface replica) placed on the curable resin, so that the ultraviolet-curable resin layer came to have a film thickness of about 50 μm. Subsequently, this was irradiated with ultraviolet from the lamination substrate side to cure the ultraviolet-curable resin and form a layer serving as an adhesive layer. Thus, an optical recording medium sandwiched between the resin substrate and the lamination substrate was prepared. For the ultraviolet-curable resin for laminating, use can be made of a high-pressure mercury lamp or a metal halide lamp as well as a xenon flashlamp. In the invention, the ultraviolet-curable resin for laminating was cured by irradiation at a little over 500 mJ, which is among ordinary conditions.

Incidentally, the modulus of elasticity and the glass transition temperature Tg of the ultraviolet-cured resin were measured with a dynamic viscoelasticity tester (DDV Series, manufactured by Reovibron) under the conditions of a measuring frequency of 10 Hz and a heating rate of 3° C./min.

<Evaluation of Recording/Reading Characteristics before Durability Test>

Evaluation Machine: recording drive DW-822A (FW: B3CC01), manufactured by Benq

Recording Speed: 8-times velocity for DVD (linear speed, 28 m/s; often referred to as 8×)

Recording Power: 13 mW to 18 mW

<OK/NG Judgment Criteria for Recording/Reading Characteristics>

Errors were counted in the following manner, and an OK/NG judgment was based on the results.

Evaluation Machine: DVDT+R manufactured by Expert (equipped with a drive unit for Philips DVDR-1000).

Errors were counted with the evaluation machine. In accordance with recordable-DVD standards, the recording medium was judged to be NG (spec-off) when it had 280 or more PI errors or had (came to have) one or more PO errors.

<Method of Durability Test>

Five disks which each had undergone recording at the 8-times velocity were introduced into the following durability tester and held therein for 100 hours at 90° C. and a relative humidity of 80% (nonoccurrence of dew condensation during heating, during the test at the target achieving temperature, and during cooling was ascertained). Subsequently, the 8-times velocity recorded parts were examined for errors, and the disks were then introduced into the durability tester again. The above operation was repeated. For the durability test, PR-2KP, manufactured by Tabai, was used.

The laminated disks produced by the procedure described above, which comprised 100-nm pure silver as a first reflective layer and 50-nm pure gold as a second reflective layer, were examined for error change before and after the durability test.

Figure 2:
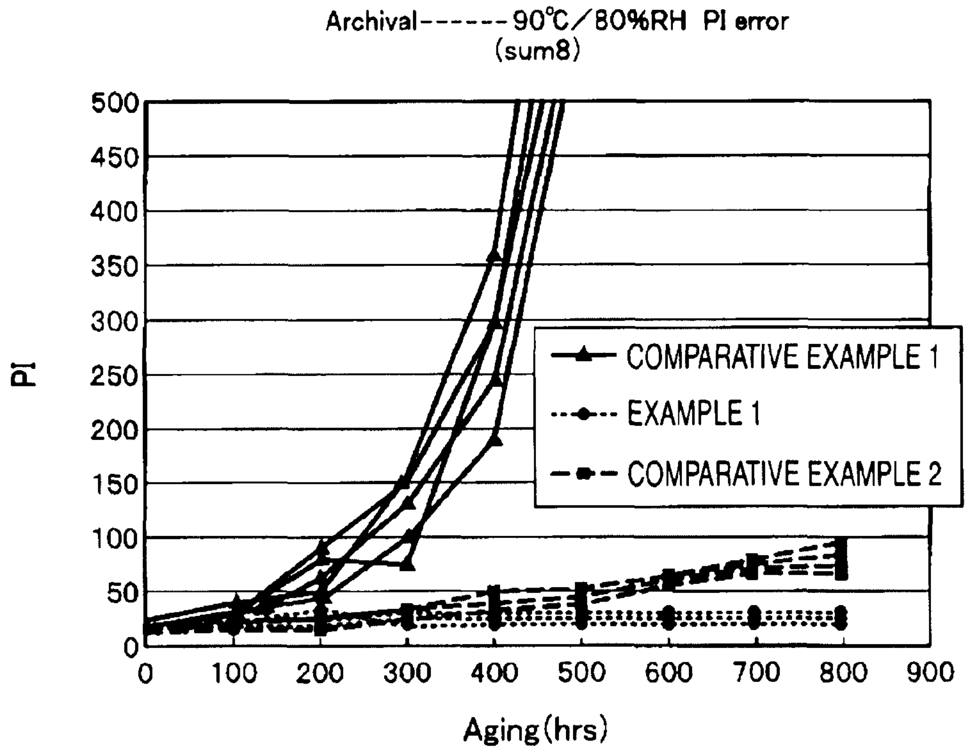
FIG. 2 (*a*) is a view showing changes in PI error before and after a durability test in Example 1, Comparative Example 1, and Comparative Example 2; and (b) is a view showing changes in PO error before and after a durability test in Example 1, Comparative Example 1, and Comparative Example 2.
Figure 2:
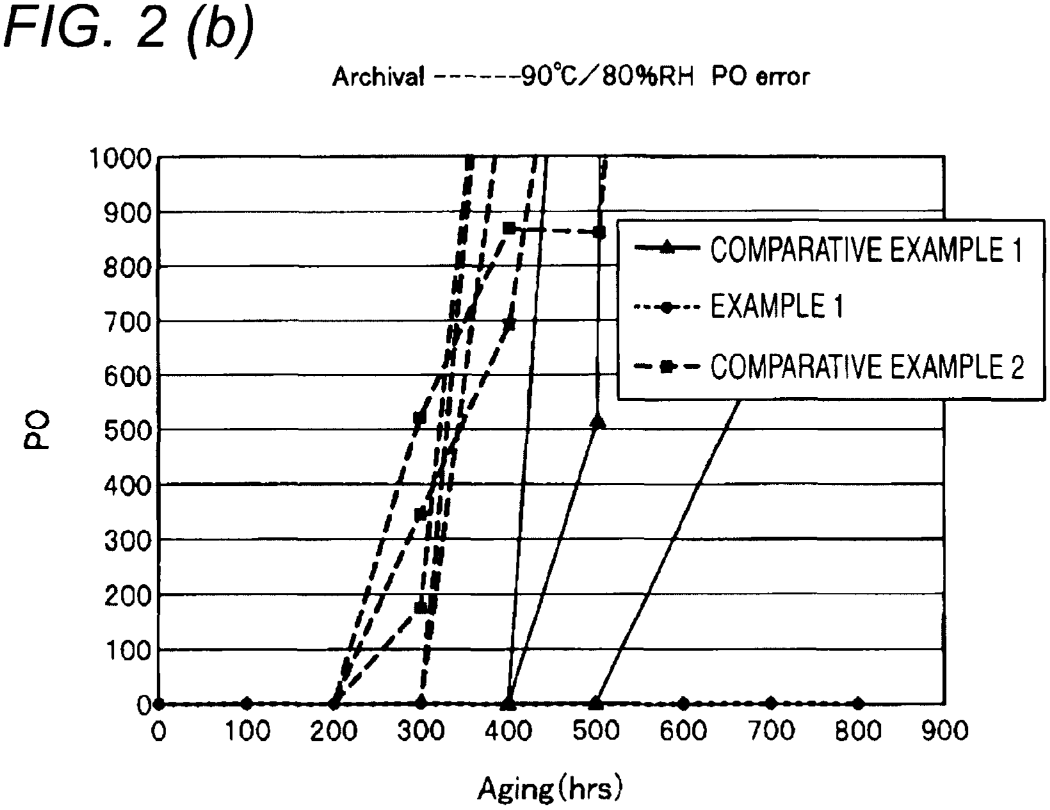

The results obtained are shown in Table 2 and FIGS. 2 (*a*) and (*b*). As indicated by the dotted lines in FIGS. 2 (*a*) and (*b*), these showed almost no change in PI error and had no PO error, even after standing under the severe conditions of 90° C. and a relative humidity of 80% over a period as long as 800 hours.

These were exceedingly satisfactory.

Comparative Example 1

Laminated disks were produced in completely the same manner as in Example 1, except that the reflective layers were replaced by one reflective layer made of pure silver having a thickness of 160 nm. These were examined for error change before and after the durability test in the same manner as in Example 1. The results obtained are shown in Table 2 and FIGS. 2 (*a*) and (*b*). As indicated by the solid lines in FIGS. 2 (*a*) and (*b*), in the case of one reflective layer of pure silver, these deteriorated to increase in PI error beyond the upper limit in the standards in 400 hours. In addition, PO errors also came to occur considerably after 400 hours.

Comparative Example 2

Laminated disks were produced in completely the same manner as in Example 1, except that the reflective layers were replaced by one reflective layer made of pure gold having a thickness of 180 nm. These were examined for error change before and after the durability test in the same manner as in Example 1. The results obtained are shown in Table 2 and FIGS. 2 (*a*) and (*b*). As indicated by the broken lines in FIGS. 2 (*a*) and (*b*), PO errors came to occur considerably after 200 hours although the number of PI errors increased to as small as 100 or below through 800 hours. These parts where errors had occurred were examined and, as a result, a defect in which the reflective gold layer had swelled to form a bubble-like protrusion was observed. This defect is thought to be a shape abnormality at the interface between the dye and the reflective layer in an 8-times velocity recorded part. Such defects are thought to be defeats developed by the following mechanism.

During the recording at a speed as high as the 8-times velocity, high thermal/physical stresses generated at the interface between the dye and the reflective layer, and this resulted in residual deformation because of the softness of the gold.

Water oozing from the resin substrate occurred in those deformed parts during the durability test, and disk warpage or the like occurred due to temperature/humidity cycling, resulting in the defects.

A reflective gold layer has hitherto been known as an exceedingly satisfactory reflective layer because of the chemical stability thereof. However, the investigation revealed that the reflective gold layer after recording under such high-speed recording conditions causes local defects although satisfactory in PI error.

Incidentally, the sputtering film deposition conditions used for the only one gold layer as the reflective layer included a deposition power of 3.0 kW, voltage of 510 to 600 V, current of 5.0 to 6.1 A, argon flow rate of 75 sccm, and achievement degree of vacuum of $1.0\times10^{-2}$ mbar.

Comparative Example 3

Laminated disks were produced in completely the same manner as in Example 1, except that the first reflective layer and the second reflective layer were replaced by a sputtering film of 20-nm pure-gold and a sputtering film of 140-nm pure-silver, respectively. These were examined for error change before and after the durability test in the same manner as in Example 1. The results obtained are shown in Table 2.

In Comparative Example 3, the influence of the pure-gold layer had been expected to be low because the first reflective layer was formed thinly. However, PO errors occurred at 200 hours after. Deterioration was apparent.

Comparative Example 4

Laminated disks were produced in completely the same manner as in Example 1, except that the first reflective layer and the second reflective layer were replaced by a sputtering film of 120-nm pure-gold and a sputtering film of 50-nm pure-silver, respectively. These were examined for error change before and after the durability test in the same manner as in Example 1. The results obtained are shown in Table 2.

In Comparative Example 4, both PI errors and PO errors occurred considerably at 200 hours after, and deterioration was apparent.

Because PI errors and PO errors occurred considerably at 200 hours after, the durability test after 200 hours was omitted.

Comparative Example 5

Laminated disks were produced in completely the same manner as in Example 1, except that the first reflective layer and the second reflective layer were replaced by a sputtering film of 40-nm pure-silver and a sputtering film of 70-nm copper/silver (silver, 12.8 atom %; thermal conductivity, 404 W/m·K (300 K)), respectively. These were examined for error change through the durability test in the same manner as in Example 1. The results obtained are shown in Table 2. In Comparative Example 5, PO errors had occurred at 200 hours after, and deterioration was hence apparent. Because PO errors occurred at 200 hours after, the durability test after 200 hours was omitted.

Comparative Example 6

Laminated disks were produced in completely the same manner as in Example 1, except that the first reflective layer and the second reflective layer were replaced by a sputtering film of 40-nm pure-silver and a sputtering film of 70-nm pure-gold, respectively. These were examined for error change before and after the durability test in the same manner as in Example 1. The results obtained are shown in Table 2. In Comparative Example 6, both PI errors and PO errors occurred considerably at 200 hours after, and deterioration was apparent. Because PI errors and PO errors occurred considerably at 200 hours after, the durability test after 200 hours was omitted.

TABLE 2

Results of Durability Test (PI error, PO error)

| | | Example 1 | | Comparative Example 1 | | Comparative Example 2 | |
|---|---|---|---|---|---|---|---|
| First reflective layer | | pure silver 100 nm | | pure silver 160 nm | | pure gold 180 nm | |
| Second reflective layer | | pure gold 50 nm | | | | | |
| Durability test | | PI | PO | PI | PO | PI | PO |
| (90° C./80% RH) | Initial value | 13 | 0 | 18 | 0 | 16 | 0 |
| | 200 hr | 26 | 0 | 92 | 0 | 28 | 0 |
| | 400 hr | 27 | 0 | 360 | 0 | 49 | 1000 or larger |
| | 800 hr | 28 | 0 | 1600 or larger | 500 or larger | 92 | 1000 or larger |

TABLE 2-continued

| Results of Durability Test (PI error, PO error) | | Comparative Example 3 | | Comparative Example 4 | | Comparative Example 5 | | Comparative Example 6 | |
|---|---|---|---|---|---|---|---|---|---|
| First reflective layer | | pure gold 20 nm | | pure gold 120 nm | | pure silver 40 nm | | pure silver 40 nm | |
| Second reflective layer | | pure silver 140 nm | | pure silver 50 nm | | copper/silver 70 nm | | pure gold 70 nm | |
| Durability test | | PI | PO | PI | PO | PI | PO | PI | PO |
| (90° C./80% RH) | Initial value | 17 | 0 | 27 | 0 | 13 | 0 | 15 | 0 |
| | 200 hr | 76 | 3 | 1600 or larger | 500 or larger | 17 | 4 | 1600 or larger | 500 or larger |
| | 400 hr | 89 | 3 | — | | — | | — | |
| | 800 hr | 149 | 12 | — | | — | | — | |

Examples 2 to 5

Laminated disks were produced in completely the same manner as in Example 1, except that the film thicknesses of the first reflective layer which was made of pure silver, and the second reflective layer which was made of pure gold, were changed as shown in Table 3.

The disks of Examples 2 to 5 and the disks of Example 1 and Comparative Examples 1 to 6 were subjected to the same recording as in Example 1 and then examined for reflectance and jitter. The values of reflectance (average for disk samples) and jitter value (average for disk samples) for these disks are shown in Table 3. These measured values were obtained by examining the disks before the durability test.

TABLE 3

| Reflectance, Jitter Value (average for disks) | Example 1 | Example 2 | Example 3 | Example 4 | Example 5 |
|---|---|---|---|---|---|
| First reflective layer | pure silver 100 nm | pure silver 120 nm | pure silver 140 nm | pure silver 140 nm | pure silver 140 nm |
| Second reflective layer | pure gold 50 nm | pure gold 50 nm | pure gold 50 nm | pure gold 30 nm | pure gold 20 nm |
| Total reflective-layer thickness | 150 nm | 170 nm | 190 nm | 170 nm | 160 nm |
| Reflectance (%) | 44.56 | 45.13 | 45.13 | 45.3 | 46.30 |
| Minimum value of jitter (%) | 7.5 | 8.2 | 8.3 | 8.3 | 7.9 |

| | Comparative Example 1 | Comparative Example 2 | Comparative Example 3 | Comparative Example 4 | Comparative Example 5 | Comparative Example 6 |
|---|---|---|---|---|---|---|
| First reflective layer | pure silver 160 nm | pure gold 180 nm | pure gold 20 nm | pure gold 120 nm | pure silver 40 nm | pure silver 40 nm |
| Second reflective layer | | | pure silver 140 nm | pure silver 50 nm | copper/silver 70 nm | pure gold 70 nm |
| Total reflective-layer thickness | 160 nm | 180 nm | 160 nm | 170 nm | 110 nm | 110 nm |
| Reflectance (%) | 47.16 | 41.76 | 46.53 | 39.45 | 47.45 | 42.04 |
| Minimum value of jitter (%) | 7.3 | 7.5 | 7.5 | 8.8 | 8.6 | 8.3 |

The disks of Examples 2 to 5 and the disks of Example 1 and Comparative Examples 1 to 3 were exposed for 260 hours to sunlight from the lamination substrate side which had no label print. Thereafter, existence or nonexistence of yellowing/deterioration of the adhesive layer of the discs were observed. The results obtained are shown.

TABLE 4

| Results of Light Resistance Test (appearance) | Example 1 | Example 2 | Example 3 | Example 4 |
|---|---|---|---|---|
| First reflective layer | pure silver 100 nm | pure silver 120 nm | pure silver 140 nm | pure silver 140 nm |
| Second reflective layer | pure gold 50 nm | pure gold 50 nm | pure gold 50 nm | pure gold 30 nm |

TABLE 4-continued

Results of Light Resistance Test (appearance)

| | | | | |
|---|---|---|---|---|
| Light resistance test (sunlight, 260 hr) | no change | no change | no change | no change |

| | Example 5 | Comparative Example 1 | Comparative Example 2 | Comparative Example 3 |
|---|---|---|---|---|
| First reflective layer | pure silver 140 nm | pure silver 160 nm | pure gold 180 nm | pure gold 20 nm |
| Second reflective layer | pure gold 20 nm | | | pure silver 140 nm |
| Light resistance test (sunlight, 260 hr) | no change | yellowing | no change | slight yellowing |

It can be seen from Table 4 that in the disks having pure silver as the outermost reflective layer (Comparative Example 1 and Comparative Example 3), the adhesive layer yellowed/deteriorated. On the other hand, it was found that even when pure silver is used as the first reflective layer, the yellowing/deterioration of the adhesive layer can be prevented by forming a pure-gold layer, which has a low reflectance and has a lower thermal conductivity than pure silver, as a second reflective layer on the first reflective layer.

(2) Experimental Examples for CD-R

Experimental Examples in the case of a CD-R are shown below.

Example 6

Preparation of Optical Recording Medium

First, a polycarbonate was injection-molded with a nickel stamper for CD-R production which had a groove formed in the surface thereof to thereby form a resin substrate which had a diameter of 120 mm and a thickness of 1.2 mm and had a groove having a pitch of 1.5 μm. A solution prepared by dissolving a phthalocyanine-based dye as an organic dye compound in an organic solvent was dropped onto the resin substrate and subjected to spin coating. Thereafter, the coating film was dried with heating to form a recording layer. The film thickness of the recording layer was regulated so that the recording layer had an OD value of 0.57 as measured at the maximum absorption wavelength for the dye compound.

As soon as possible after the formation of the recording layer, a sputtering film of pure silver was deposited in a film thickness of 80 nm as a first reflective layer on the recording layer. Furthermore, a sputtering film of pure gold was deposited in a film thickness of 30 nm as a second reflective layer.

An ultraviolet-curable resin was applied to the second reflective layer of the disk prepared by the method described above, and was then subjected to spin coating. Subsequently, this was irradiated with ultraviolet from the applied ultraviolet-curable resin side. Thus, the ultraviolet-curable resin was cured to form a protective layer.

<Evaluation of Recording/Reading Characteristics Before Durability Test>

Evaluation Machine: recording drive PX-R820T (FW:1.03), manufactured by Plextor

Recording Speed: 8-times velocity for CD (linear speed, 9.6 m/s; often referred to as 8×)

Recording Power: 12 mW to 17 mW

<OK/NG Judgment Criteria for Recording/Reading Characteristics>

Errors were counted in the following manner, and an OK/NG judgment was based on the results.

Evaluation Machine: CD-CATS, manufactured by Audio.

Errors were counted with the evaluation machine. In accordance with CD-R standards, the recording medium was judged to be NG when it had a BLER of 220 (spec) or higher. The term BLER means block error rate.

<Method of Durability Test>

Five disks which each had undergone recording at the 8-times velocity were introduced into the following durability tester and held therein for 100 hours at 90° C. and a relative humidity of 80% (nonoccurrence of dew condensation during heating, during the test at the target achieving temperature, and during cooling was ascertained). Subsequently, the 8-times velocity recorded parts were examined for errors, and the disks were then introduced into the durability tester again. The above operation was repeated. For the durability test, PR-2 KP, manufactured by Tabai, was used.

The disks produced by the procedure described above, which had 80-nm pure silver as a first reflective layer and 30-nm pure gold as a second reflective layer, were examined for BLER before and after the durability test. The results obtained are shown in Table 5. In Example 6, the disks had exceedingly satisfactory BLER values even after standing under the severe conditions of 90° C. and a relative humidity of 80% over a period as long as 800 hours. The values of reflectance also were satisfactory as shown in Table 5.

Examples 7 and 8 and Comparative Example 7

Disks were produced in the same manner as in Example 6, except that the film thicknesses of the first reflective layer and second reflective layer were changed as shown in Table 6. The disks were examined for reflectance and for BLER before and after the durability test in the same manners as in Example 6. The results obtained are shown in Table 5.

In Examples 7 and 8 also, which differed from Example 6 in the thickness of the pure-gold layer as a second reflective layer, the values of BLER after the durability test were exceedingly satisfactory. The values of reflectance also were satisfactory as shown in Table 6.

In Comparative Example 7, in which no second reflective layer was placed and an only pure-silver layer was placed as the reflective layer, the value of BLER after 800 hours of the durability test was exceedingly poor although the reflectance was satisfactory.

TABLE 5

Results of Durability Test (BLER)

| | | Example 6 | Example 7 | Example 8 | Comparative Example 7 |
|---|---|---|---|---|---|
| First reflective layer | | pure silver 80 nm | pure silver 80 nm | pure silver 80 nm | pure silver 80 nm |
| Second reflective layer | | pure gold 30 nm | pure gold 40 nm | pure gold 50 nm | |
| Reflectance (%) | | 65.18 | 64.44 | 64.52 | 66.68 |
| Durability test | Initial value | 8 | 14 | 8 | 8 |
| (90° C./ | 200 hr | 9 | 23 | 12 | 28 |
| 80% RH) | 400 hr | 15 | 25 | 18 | 37 |
| | 800 hr | 14 | 28 | 21 | 550 |

While the invention has been described in detail and with reference to specific embodiments thereof, it will be apparent to one skilled in the art that various changes and modifications can be made therein without departing from the spirit and scope thereof.

This application is based on a Japanese patent application filed on Jan. 18, 2006 (Application No. 2006-010053), the contents thereof being herein incorporated by reference.

INDUSTRIAL APPLICABILITY

The invention can be advantageously utilized in applications including optical recording media for a red semiconductor laser, such as a recordable DVD and CD-R, and optical recording media for a blue semiconductor laser.

The invention claimed is:

1. An optical recording medium, comprising:

a resin substrate;

a recording layer comprising an organic dye; and a reflective layer;

wherein:

the reflective layer comprises a first reflective layer and a second reflective layer;

the first reflective layer is in direct contact with the recording layer;

the second reflective layer is in direct contact with the first reflective layer;

the second reflective layer has a thermal conductivity lower than a thermal conductivity of the first reflective layer;

the first reflective layer comprises silver as a main component; and the second reflective layer comprises gold as a main component.

2. The optical recording medium according to claim 1, wherein a film thickness of the second reflective layer is in a range of from 1 nm to 50 nm.

3. The optical recording medium according to claim 1, wherein a film thickness of the second reflective layer is in a range of from 10 nm to 50 nm.

4. The optical recording medium according to claim 1, wherein a film thickness of the first reflective layer is in a range of from 50 nm to 200 nm.

5. The optical recording medium according to claim 2, wherein a film thickness of the first reflective layer is in a range of from 50 nm to 200 nm.

6. The optical recording medium according to claim 3, wherein a film thickness of the first reflective layer is in a range of from 50 nm to 200 nm.

7. The optical recording medium according to claim 1, wherein a film thickness of the first reflective layer is in a range of from 50 nm to 150 nm.

8. The optical recording medium according to claim 2, wherein a film thickness of the first reflective layer is in a range of from 50 nm to 150 nm.

9. The optical recording medium according to claim 3, wherein a film thickness of the first reflective layer is in a range of from 50 nm to 150 nm.

* * * * *